United States Patent [19]

Wu et al.

[11] 4,335,600
[45] Jun. 22, 1982

[54] DETECTING INTERNAL ABNORMALITIES IN TURBINES

[75] Inventors: Peter T. Wu, Clifton Park; Stephen E. Grabkowski, Schenectady, both of N.Y.

[73] Assignee: General Electric Company, Schenectady, N.Y.

[21] Appl. No.: 206,653

[22] Filed: Nov. 13, 1980

[51] Int. Cl.³ .............................................. G01M 15/00
[52] U.S. Cl. ........................................ 73/117.3; 73/660
[58] Field of Search ...................... 73/116, 117.3, 660, 73/587, 115

[56] References Cited

U.S. PATENT DOCUMENTS

| | | | |
|---|---|---|---|
| 3,798,626 | 3/1974 | Weichbrodt et al. | 340/267 R |
| 3,872,292 | 3/1975 | Dawson, Jr. | 73/116 X |
| 4,262,538 | 4/1981 | Otawara | 73/660 X |

*Primary Examiner*—Jerry W. Myracle
*Attorney, Agent, or Firm*—Donald R. Campbell; James C. Davis, Jr.; Marvin Snyder

[57] ABSTRACT

Undesirable internal changes in a running turbine are diagnosed by monitoring the dynamic pressure of the stream of fluid and the structure-borne vibration of the stationary shell. Incipient erosion of blades, material deposit buildup, and other abnormalities are detected by analyzing the dynamic pressure and vibration signal utilizing several signal processing techniques. A better maintenance schedule can be derived, this also serves as a turbine efficiency monitor.

11 Claims, 7 Drawing Figures

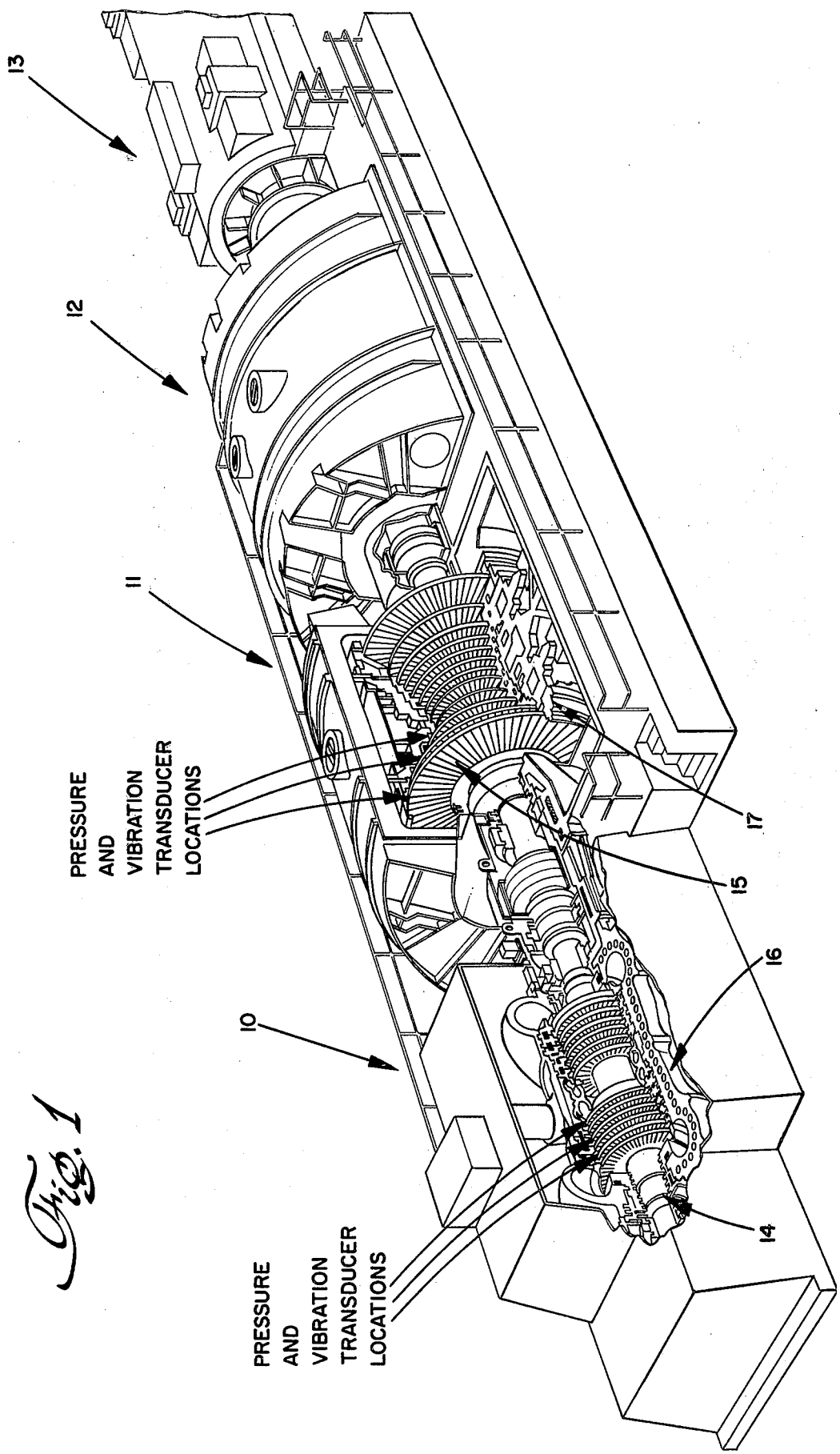

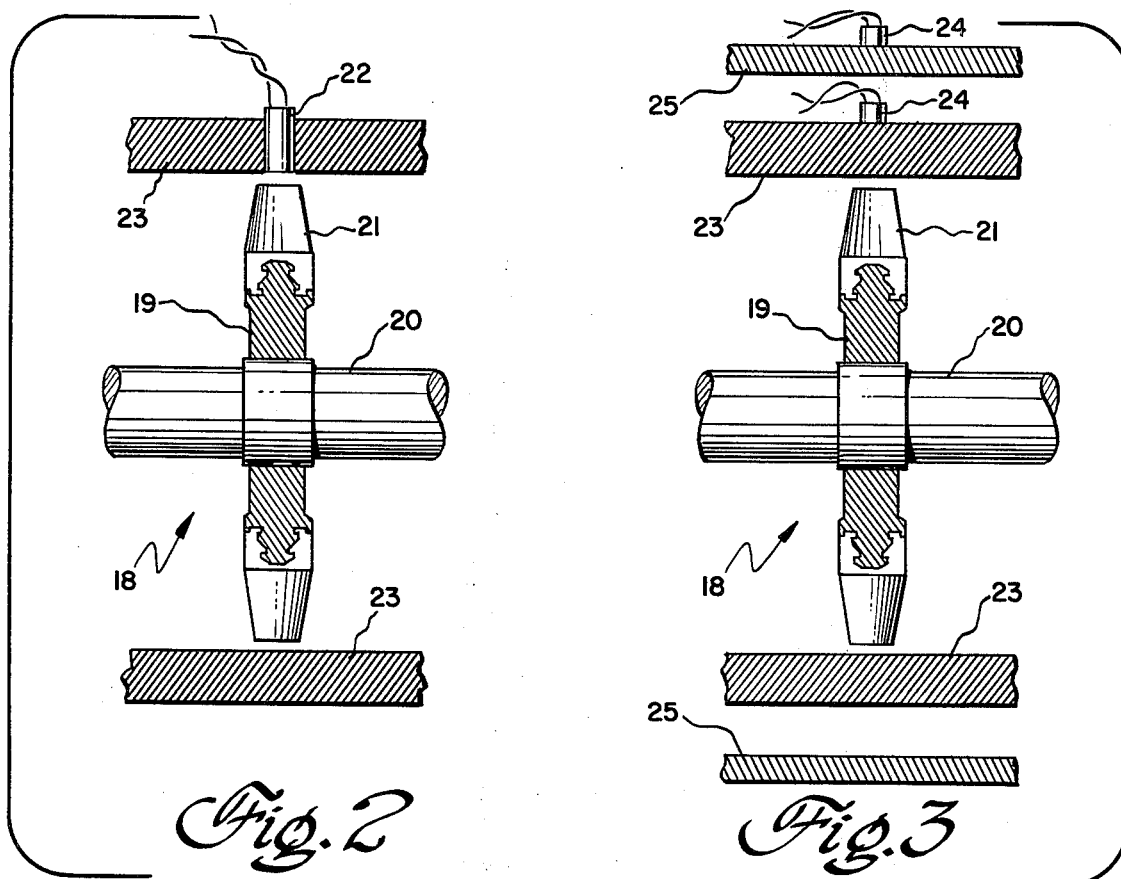
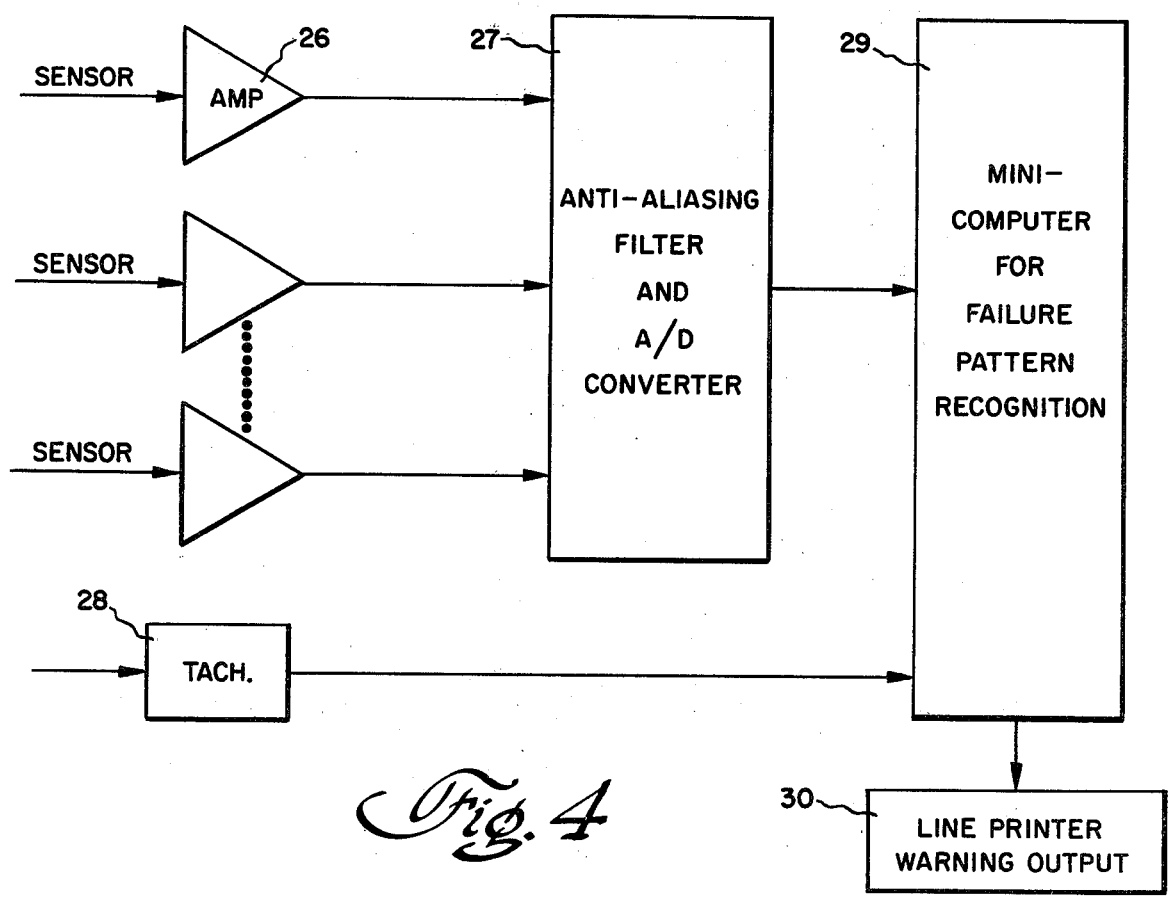

DETECTING INTERNAL ABNORMALITIES IN TURBINES

BACKGROUND OF THE INVENTION

This invention relates to monitoring the internal condition of a running turbine to discover mechanical defects and undesirable changes in the fluid flow paths.

Turbine blades are subject to erosion after a period of usage and develop pit marks and craters. The stationary parts of the turbine, such as the stationary blade system or internal surfaces of the shell, are susceptible to build up of deposited material. If these internal conditions and others such as blade rubbing and blade failure are monitored and detected early enough, scheduled maintenance may be planned ahead and forced outages reduced. Since erosion and deposit buildup will reduce turbine efficiency, the monitoring technique may also serve indirectly as a turbine efficiency monitor. The foregoing remarks are especially true of a large steam turbine-generator combination.

The present state of the art consists of monitoring temperature and static pressures to determine internal changes. An object of this invention is to provide a greater sensitivity in detection than is presently available. Due to the increased sensitivity, incipient failures may be detected earlier so that proper measures can be taken to alleviate the problem. A more efficient maintenance schedule can be devised.

SUMMARY OF THE INVENTION

The internal condition of a turbine is monitored to detect internal changes by sensing the dynamic pressure of the stream of fluid within the turbine shell and by sensing the vibration of the stationary shell. A turbine with an internal abnormality produces pressure and/or vibration signals that are different than when the turbine is free of such abnormality. These signals are processed to identify an incipient abnormality or malfunction. Eroded blades, buildup of deposited material, rubbing blades, blade failure, and other undesirable mechanical defects and changes in the fluid flow paths are discovered before a serious problem arises.

An illustrative embodiment of the failure detection system includes a high temperature dynamic pressure transducer on the internal surface of the turbine shell and a vibration transducer on the outer surface of the inner shell. Preferably multiple dynamic pressure transducers and accelerometers are distributed axially and circumferentially on the stationary inner shell. Along with a tachometer signal, the pressure and vibration signals are presented to a processor where several signal processing techniques such as filtering, averaging, correlation techniques, and coherence function techniques, are utilized to detect the presence of an incipient abnormality or the location of the abnormality.

BRIEF DESCRIPTION OF THE DRAWINGS

FIG. 1 is an outline drawing of a steam turbine-generator and cut-away views of the turbines showing sensor locations;

FIGS. 2 and 3 are diagrams of a single rotor stage and of pressure and vibration transducers mounted on the inner shell of the turbine; an alternate location for the latter is on the outer shell;

FIG. 4 is a block diagram of the failure detection system;

DESCRIPTION OF THE PREFERRED EMBODIMENTS

Figure 5:
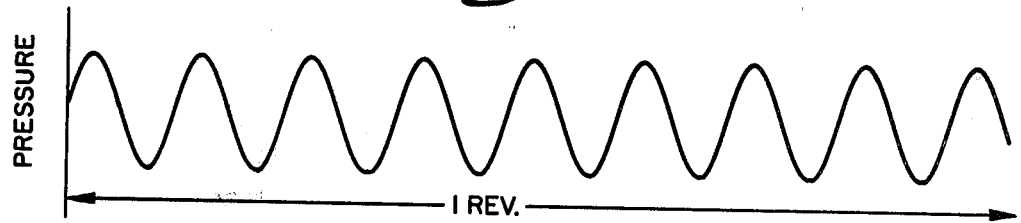
FIGS. 5 and 6 show the pressure transducer voltage for one revolution of a rotor stage with all good turbine blades and a rotor stage with one eroded blade.

Erosion in turbine blades and material deposit buildup in the shell or casing of turbines is detected through acoustic signature analysis. Steam passing smooth highly polished turbine blades will provide acoustic signatures with generally smooth profiles and lower turbulent level. As erosion occurs and pit marks and craters are developed in the blades, the generated noise will be manifested with higher frequency eddies and increased turbulent level. In addition, deposit buildup on the shell also creates changes in the acoustic signatures. The acoustic signatures thus produced would be different than that obtained when the blades had a smooth finish and where there are no deposit buildup on the shell. High temperature pressure transducers or/and vibration sensors mounted on the turbine can be used to sense the acoustic signatures. Appropriate signal processing is utilized to determine the presence of turbine blade erosion and material deposit buildup. In addition, any internal failures such as blade failure, rubbing, or changes in clearances would produce different acoustic signatures. The failure detection method and system is applicable to many different types of sizes of turbines, whether the fluid is steam, gas, or water. A comprehensive definition of a turbine is that it is a machine for generating rotary mechanical power from the energy in a stream of fluid.

The large steam turbine-generator illustrated in phantom outline in FIG. 1 is described more completely in the McGraw-Hill Encyclopedia of Science and Technology, 1960, Library of Congress Catalog Card No. 60-11000, Vol. 13, pp. 85–89. FIG. 1 is similar to the Encyclopedia Fig. 2, page 86. The high pressure steam turbine is indicated generally at 10, the low pressure steam turbines at 11 and 12, and the electric generator at 13. Part of the first-and second-mentioned turbines are cut away to reveal the rotating shaft 14 and a number of rotor stages 15 which carry the moving turbine blades. The inner shell 16 and outer shell 17 contain nozzles or a stationary blade system and passages which permit the inlet and outlet of fluid to flow in a desired manner. The shell is sometimes referred to here as the stationary part of the turbine. Typical pressure and vibration transducer locations on the stationary inner shell are designated by the arrows. Multiple dynamic pressure transducers and accelerometers are distributed axially and circumferentially on the inner shell of the turbines.

The preferred locations of the dynamic pressure transducers and vibration sensors are shown in FIGS. 2 and 3. Rotor stage 18 has a hub 19 secured to the shaft 20 and a single row of rotating turbine blades 21. A high temperature pressure transducer 22 is mounted in a hole in inner shell 23 and has its sensing element at or near the internal surface of the inner shell so as to accurately sense the pressure fluctuation in the steam flow. This transducer must withstand the high temperature and high pressure within the turbine shell which, for a large steam turbine, can be as high as 1000° F. and 3500 psi. For smaller turbines and other types of turbines, the requirements are not so rigorous. Referring to FIG. 3, accelerometer 24 is on the external surface of inner shell 23 and senses the surface vibration of the main stationary turbine components. This is a low pressure area of the shell. An alternative location of the vibration transducer, if the signals are strong, is on the external surface of outer shell 25. Every transducer 22 and 24 produces an electrical signal which varies in accordance with the sensed dynamic pressure and structure-borne vibration.

It has already been pointed out that the dynamic pressure and/or vibration signals for a turbine with an internal abnormality or mechanical defect are different than that obtained when the turbine is free of abnormalities. A rotating eroded and pitted blade causes increased turbulence in the fluid flow and generates higher frequency eddies; the noise characteristics are different. This anomaly and change in the fluid flow paths is picked up by a pressure transducer. There is a variation in the dynamic pressure signal, as compared to the pressures for normal turbine operation, which is indicative of the eroded blade condition. The buildup of the deposited material on a stationary turbine part constricts the flow. There is a change in flow pressure at that point and there is uneven loading. The uneven loading force shows up on the stationary shell as a vibration signal which is indicative of deposit buildup. The rubbing of a rotating rotor blade against a stationary part is evidenced primarily as a variation in the vibration pattern. There is an impact once per rotor revolution. This abnormality in most cases does not result in much change in the dynamic pressure signal. A lost, broken turbine blade is relatively easy to detect. The vibration transducer picks up the strong unbalance frequency associated with loss of the blade. Likewise, the pressure transducer picks up a pulse, once per revolution, which gives the location on the shaft. Another abnormality that can be detected is water induction, i.e., wet steam and water droplets are blown through the turbine. This results in a change in vibration of the stationary parts. In a minimum case, it may be possible to detect a particular abnormality utilizing only either a vibration transducer or a pressure transducer, but ordinarily pressure sensing is in combination with vibration sensing. Further, in order to determine the presence of any one of a number of different abnormalities and to realize greater sensitivity, vibration and pressure transducers are both needed and there is cross check between the two.

FIG. 4 is a simplified block diagram of a failure detection system. Signals from several sensors are passed through amplifiers 26 and presented to an anti-aliasing filter and analog-to-digital converter 27. A tachometer signal is produced by a tachometer 28 which measures the speed of rotation of the turbine shaft. The pre-processed pressure and vibration signals and the tachometer signal are further processed and analyzed by a failure pattern recognition minicomputer 29. A warning output is produced by the line printer 30 when the signal processor detects an incipient abnormality. An identification of the specific malfunction or the location of the malfunction is printed out if possible. Knowing the location of the mechanical defect is sometimes equivalent to knowing what the defect is.

Standard methods of improving the signal-to-noise ratio are employed as needed, and certain signal processing techniques are relied on, usually in combination, to analyze the sensor signals. The particular combination of signal processing depends on the turbine abnormality that is being looked for. Signal averaging involves averaging together a number of signal samples, using the tachometer as a trigger. Noise is random and tends to cancel out, while the signals indicative of the anomaly are additive. Time domain signal averaging reduces the effects of normal turbulent noise. The second processing technique is filtering, which extracts expected frequencies associated with certain phenomenon. Appropriate filtering provides a great improvement to the signal-to-noise ratio in detecting the various degradation modes. A third processing technique is correlation, defined as a measurement of the tendency of two random variables to vary together. Correlation techniques between various sensors is used to detect and localize changes in the pressure and vibration signals. Let it be assumed that the signals originate from a certain point where the abnormality is. Is it possible to determine the delay time between signals and therefore, by triangulation, the location of the abnormality. The fourth processing technique is the coherent function technique. Having a number of channels of measurement, the coherence function technique can be used to sort out the relationship between the signal of each channel. This is done by removing the linear effect of one or more channels from a particular channel in a systematic manner. This technique is a powerful tool to analyze the signal transmission paths and determine the origin of the abnormality which is the source of the signal. The technique can also be used to decompose a signal into various components each of which can be associated with a known source and thereby gaining a more detailed understanding of the signal.

Figure 6:
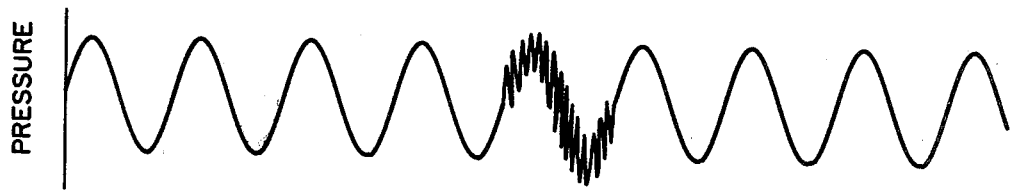

The early detection of a signal eroded rotor blade by analyzing the dynamic pressure and vibration signals is more fully explained as follows. The pressure signal developed by one revolution of a good turbine blade row with smooth highly polished blades is diagrammed in FIG. 5. The pressure transducer senses a fluctuation in pressure as each blade rotates past the transducer. When there is one eroded blade, see FIG. 6, there is a signal change once per revolution at a fixed angle. Typically, there is a burst of high frequency noise or a burst of certain frequencies; filtering extracts this high frequency signal.

Figure 7:
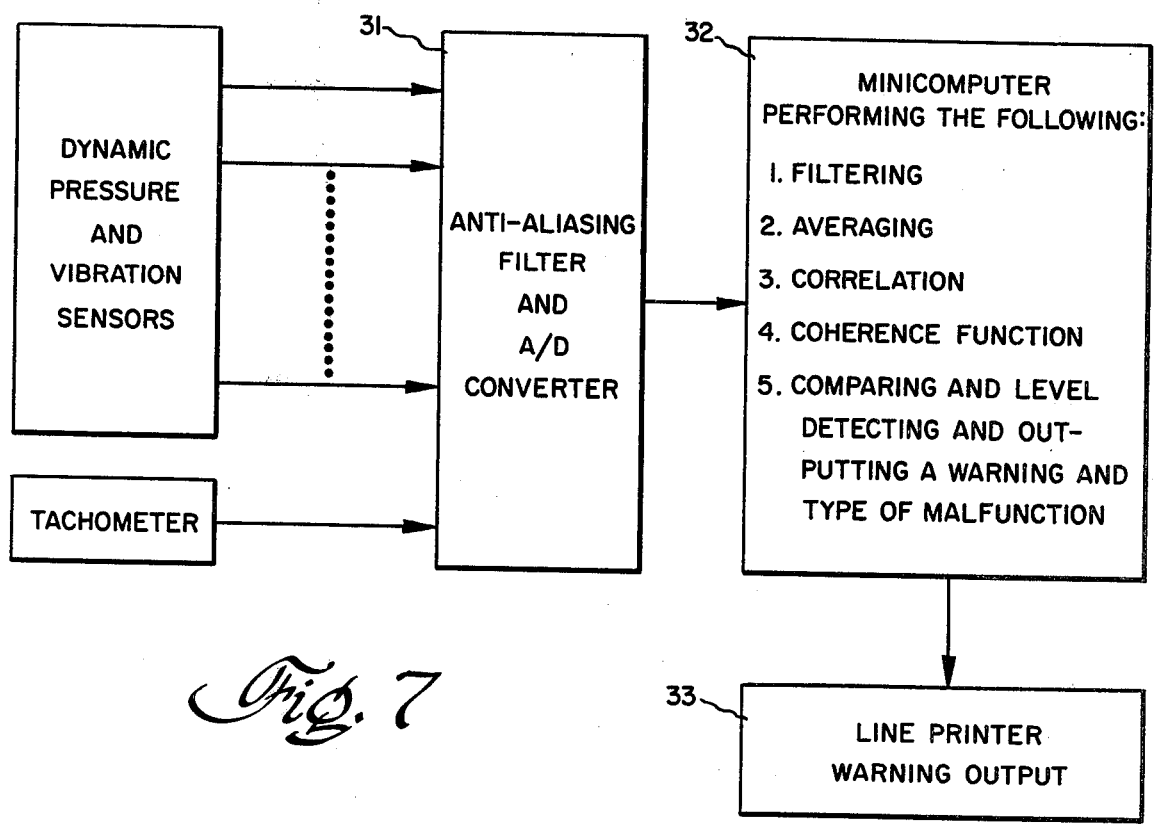
FIG. 7 is a block diagram of a system that detects the damaged blade.

The signal processor for producing a warning of the incipient eroded blade condition can take the form in FIG. 7. There are for instance three dynamic pressure sensors and one vibration sensor. The malfunction of the turbine will be reflected by signals from the pressure transducers and (or) vibration sensors. The tachometer signal provides a timing reference to the above signals to facilitate averaging and event recognition. All the input signals are fed to circuitry 31 for conditioning and digitization prior to inputting to the minicomputer 32. With the proper software, the computer will perform a variety of combinations of the tasks listed as 1 through 5 according to the need for detecting various malfunctions. An eroded blade condition is determined by, as a minimum, filtering and averaging every pressure signal, comparing these averaged signals with a previous normal signals, and level detecting. Upon detection of a particular malfunction (or malfunctions), a warning message will be sent to a line printer 33. The message will contain if possible what type of malfunction, where it occurs, and the degree of severity. One suitable minicomputer is the Digital Equipment Corp. PDP-11 used in conjunction with the CSP, Inc. macroarithmetic array processor.

Incipient erosion, deposit buildup, and other internal abnormalities, mechanical defects, and undesirable changes in the fluid flow paths are detected earlier so that scheduled maintenance may be planned ahead to reduce forced down time. Since these internal conditions reduce turbine efficiency, this technique also serves indirectly as a turbine efficiency monitor. The dynamic acoustic signatures contain more detailed information on the internal condition of the turbine. A greater sensitivity in detection is realized than is presently available.

While the invention has been particularly shown and described with reference to several preferred embodiments thereof, it will be understood by those skilled in the art that various changes in form and details may be made therein without departing from the spirit and scope of the invention.

The invention claimed is:

1. The method of monitoring a running turbine, which has a stationary shell enclosing a multi-bladed rotor and generates rotary mechanical power from the energy in a stream of fluid, comprising the steps of:
    sensing the dynamic pressure of the fluid within the turbine shell and producing a corresponding pressure signal;
    sensing the vibration of the turbine shell and producing a corresponding vibration signal; and
    processing said pressure and vibration signals; both of which are electrical signals, to detect undesirable internal mechanical defects and changes in the fluid flow paths that lead to turbine malfunction.

2. The method of claim 1 wherein said dynamic pressure is sensed at the internal surface of the turbine shell.

3. The method of claim 1 wherein the dynamic pressure of the fluid and vibration of the turbine shell are sensed at a plurality of axially and circumferentially distributed positions.

4. The method of claim 3 wherein said pressure and vibration signals are processed to yield the location of said internal mechanical defect.

5. The method of monitoring a running turbine, which has a stationary structure including an inner shell enclosing a multibladed rotor and which generates rotary mechanical power from the energy in a stream of fluid, comprising the steps of:
    sensing the dynamic pressure of the fluid at the internal surface of the inner shell and producing a corresponding pressure signal;
    sensing structure-borne vibrations at the external surface of the inner shell and producing a corresponding vibration signal;
    sensing the rotation of the rotor and producing a tachometer signal; and
    processing said pressure, vibration, and tachometer signals, all of which are electrical signals, to detect internal abnormalities and changes in the fluid flow paths that lead to turbine malfunction.

6. The method of claim 5 wherein the dynamic pressure of the fluid and vibrations of the inner shell are both sensed at a plurality of axially and circumferentially distributed positions.

7. The method of claim 6 wherein the processing of said pressure, vibration, and tachometer signals includes signal averaging to reduce the effects of normal turbulent noise, filtering to extract certain frequencies, correlation techniques between signals sensed at different locations, and coherence function techniques between signals sensed at different locations.

8. The combination comprising:
    a turbine for generating rotary mechanical power from the energy in a stream of fluid which has a stationary shell enclosing a multi-bladed rotor;
    at least one dynamic pressure transducer mounted at an internal surface of said shell which produces an electrical signal in accordance with the dynamic pressure of said fluid;
    at least one vibration transducer on another surface of said stationary shell which produces an electrical signal in accordance with the vibration of said shell; and
    a processor for analyzing said pressure and vibration signals to detect internal abnormalities and changes in the fluid flow paths that lead to turbine malfunction.

9. The combination of claim 8 wherein said processor is comprised of an anti-aliasing filter, an analog-to-digital converter, and a minicomputer.

10. The combination comprising:
    a turbine for generating rotary mechanical power from the energy in a stream of fluid which has a stationary shell enclosing a multi-bladed rotor;
    at least one high temperature dynamic pressure transducer mounted at an internal surface of said shell which produces an electrical signal in accordance with the dynamic pressure of said fluid;
    at least one vibration transducer on another surface of said stationary shell which produces an electrical signal in accordance with the vibration of said shell;
    means for sensing the rotation of said rotor and producing a tachometer signal; and
    a processor for analyzing said pressure, vibration, and tachometer signals and detecting an internal mechanical defect and change in the fluid flow paths which is indicative of reduced turbine efficiency and incipient failure.

11. The combination of claim 10 wherein a plurality of both said dynamic pressure and vibration transducers are on said stationary shell at different axial and circumferential positions.

* * * * *